United States Patent [19]
Young

[11] 3,726,207
[45] Apr. 10, 1973

[54] VEHICLE AIR DEFLECTOR

[76] Inventor: S. N. Jack Young, 1248 Schir Dr., Bossier, La.

[22] Filed: Oct. 18, 1971

[21] Appl. No.: 189,843

[52] U.S. Cl. ..................................98/2.12, 98/2.13
[51] Int. Cl. ................................................B60h 1/24
[58] Field of Search..............................98/2.12, 2.13

[56] References Cited

UNITED STATES PATENTS

| | | | |
|---|---|---|---|
| 2,797,126 | 6/1957 | Brooks | 98/2.12 |
| 2,847,246 | 8/1958 | Caradonna | 98/2.12 |
| 3,618,507 | 11/1971 | Rakocy | 98/2.12 |

Primary Examiner—William J. Wye
Attorney—Martin Fleit et al.

[57] ABSTRACT

An attachable and detachable air deflecting apparatus for a vehicle, mounted in a conventional vehicle window frame having a movable window pane capable of being raised and lowered. The air deflecting apparatus comprises an elongated body of transparent planar material having a length substantially equal to the length of the forward edge of the vehicle window. Insert edges are secured to each end of the elongated body and adapted to be inserted into the frame of the window to mount the air deflecting apparatus to the window. A center spring clip defining a recess is secured to the middle section of the elongated body to engage the window pane of the vehicle and hold the elongated body to the window pane flush against the window frame.

10 Claims, 5 Drawing Figures

PATENTED APR 10 1973 3,726,207
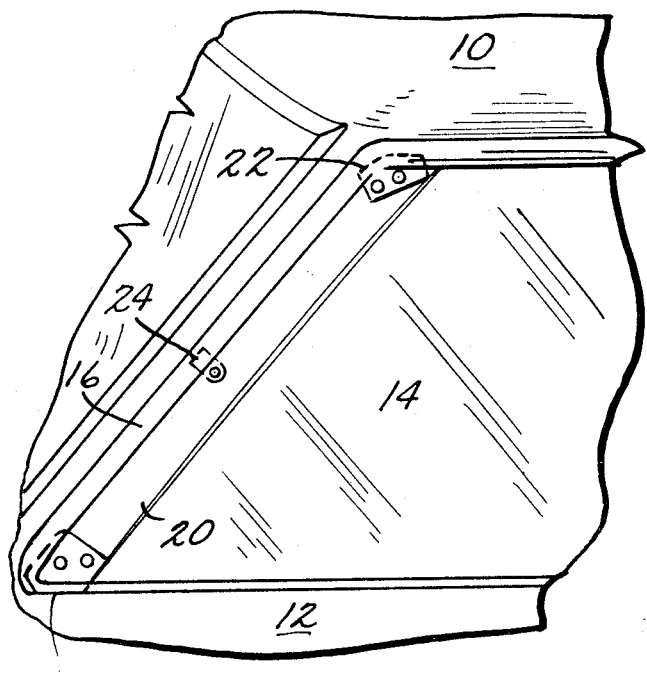
FIG. 1.
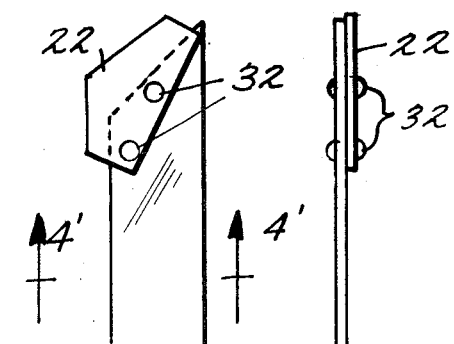
FIG. 2. FIG. 3.
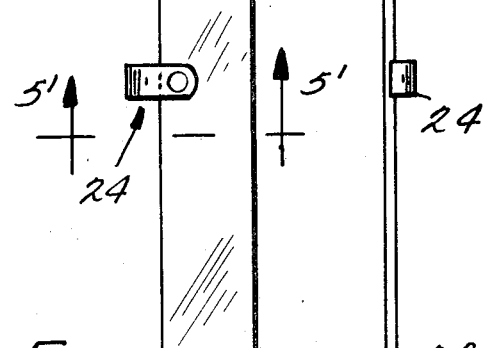
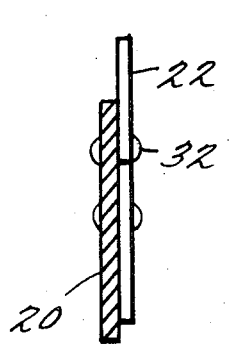
FIG. 4.
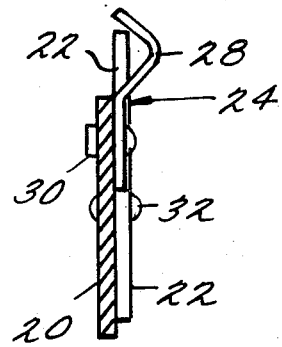
FIG. 5.
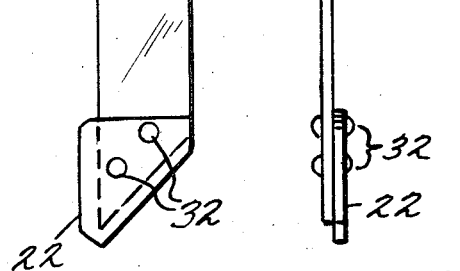
INVENTOR
S.N. JACK YOUNG
BY
Fleit, Gippie & Jacobson
ATTORNEYS

VEHICLE AIR DEFLECTOR

The present invention generally relates to an air deflector apparatus which is adapted to be easily attached and detached to a vehicle door window frame. The air deflector is designed to fit in a window opening of the vehicle causing air, and those materials carried by air such as moisture, dirt and bugs to be deflected outwardly at a specified angle when the air passes by the vehicle.

The invention specifically relates to an air deflector having an elongated body which is adapted to be placed in or in connection with the window opening of a door frame of an automotive vehicle to extend substantially across the forward edge of the window opening so that air is deflected at an angle past the automotive vehicle. The air deflector provides effective means for deflecting air, rain and dust from the vehicle window by providing shielding which prevents horizontal and substantially vertical currents of air and rain from contacting the window, during travel.

The simple construction of the air deflector allows it to be easily installed in a conventional window opening in a few minutes without any structural alteration of the window frame and with maximum ease and speed without requiring the use of tools or any special skills. The air deflector is installed without the need for holes to be drilled in the body of the vehicle and without the use of screws or other fasteners.

Prior air deflectors have been provided for attachment to various places on a vehicle for a multitude of purposes, including the introduction of air into the vehicle, the directing of air away from the vehicle, the reduction of noise created by the passage of air around the vehicle and for various other purposes.

Air deflectors are common in the prior art; however, many such air deflectors previously were constructed to be placed on the ventilator windows of an automobile. Such prior art air deflectors are shown in U.S. Pat. Nos. 2,583,759, 2,622,921 and 2,582,914. Other prior art discloses air deflectors which were adapted to be mounted to a door frame of a vehicle to provide the desired air deflection. These air deflectors were cumbersome and presented an unsightly appearance, as is shown in U.S. Pat. Nos. 2,242,606 and 2,281,840.

The present invention provides an air deflector for use in modern vehicles, namely those vehicles having single-unit side window panes with no ventilating window. The invention is installed by mounting it in the forward section of the window opening so that it slightly protrudes outward from the window to provide the desired air deflection.

Other advantages and embodiments of the invention will become apparent from the following detailed description and upon reference to the accompanying drawings.

BRIEF DESCRIPTION OF THE DRAWINGS:

FIG. 1 is a partial perspective view of a portion of a vehicle showing the air deflector invention mounted thereto.

FIG. 2 is a planar view of the air deflector shown in FIG. 1.

FIG. 3 is a side view of the air deflector shown in FIG. 2.

FIG. 4 is an enlarged cross-sectional view of FIG. 2 taken along lines 4'4'.

FIG. 5 is an enlarged cross-sectional view of FIG. 2 taken along the lines of 5'5'.

DETAILED DESCRIPTION OF THE DRAWINGS

FIG. 1 shows a vehicle body 10 having a door 12 with a conventional side window pane 14 in a closed position. The window frame 16 forming the window opening is provided with a channel guide for the sliding glass pane 14 and continuous casing on its sides and top which receive the window pane 14 when it is run up in a closed position. In modern vehicles the side window is of unitary construction and is not divided into two sections by a divisor bar or mullion which separates a ventilator pane of glass from the principal side door window pane. Prior air deflectors were not constructed to be easily installed on the unitary side windows of modern vehicles particularly automotive vehicles. Consequently the present invention was developed to fill this need.

As shown by the figures, the present novel air deflector comprises an elongated strip body 20 of transparent plastic material preferably having a uniform thickness and a width ranging from 1½ inch to 3 inch. In one embodiment of the invention each side of the strip body is parallel to its opposite side. The length of the body 20 is substantially the same length as the forward edge of the window frame 16, so that when installed it occupies the forward edge of the window frame flush against the window frame. The air deflector body is preferably constructed of a clear suitably tinted transparent plastic material having a suitable thickness and strength. The use of clear or tinted plastic is preferred because it matches any color combination of the vehicle and does not obstruct the driver's view by producing any blind spots during operation of the vehicle. However, any suitable material or combination of materials in addition to plastic can be used in the construction of the air deflector.

The air deflector is secured to the window frame 16 by a plurality of end clips 22. The end clips 22 are preferably secured to the air deflector body 20 by rivets 32; however, any other suitable means, such as adhesive or other suitable bonding agents, can be used. The end clips 22 preferably have a substantially pentagonal shaped configuration and flat surface which allows them to be inserted into the window frame and respective sealing strip.

When the air deflector is mounted to the forward edge of the front window frame of a vehicle one has only to pull back the edge of the sealing strip on the window frame and insert the end clips 22 therein. The sealing strip and frame cooperate to hold the end clips 22 and corresponding strip body 20 firmly in place.

A hook shaped center clip 24 is preferably secured to the center section of the air deflector body 20 by suitable means such as a nut and bolt means 30. However, other suitable securing means as for example, adhesive, can be used. The hooked shaped center clip 24 comprises a planar section 26 which is substantially parallel to the air deflector body and a protruding end portion 28 having a substantially U-shape. The U-shaped section forms a hook to fit over the forward edge of the car window pane 14 when the window is raised and the elongated body 20 has been mounted to the window frame. The U end of the center clip 24 additionally serves as a guide for the window pane 14 allowing the window pane to move up and down in a track with respect to the air deflector body. The center clip 24 has a primary support purpose providing support for the air deflector body 20 against the air flow, keeping the air forces from bowing the deflector body, thereby preventing air from flowing directly against the window pane itself.

The novel air deflector is made in both right and left hand embodiments for installment on both the right and left hand side windows of the vehicle. Preferably a right and a left hand deflector is provided as a pair for a vehicle for attachment to the side windows.

The air stream which is thrown outward during the travel of the vehicle allows air from the interior of the vehicle body to be drawn outwardly when the window is opened by reason of the partial vacuum created along the trailing edge of the deflector. Thus, this deflection additionally provides for continuing air circulation within the vehicle, while eliminating the noise of the rushing air and the entrance of foreign bodies into the interior of the vehicle.

While the preferred embodiment of the invention has been disclosed, it is understood that the invention is not limited to such an embodiment since it may be otherwise embodied in the scope of the appended claims.

What is claimed is:

1. Air deflecting apparatus adapted for use with a vehicle body side window frame comprising a flexible member, said flexible member comprising a planar elongated body, having a length substantially equal to the forward edge of said side window frame, planar clip means secured to each end of said flexible body and extending from said flexible body, said planar end clip means being adapted for fixed connection to said window frame, a center clip secured to said flexible body, said center clip having a planar section secured to said flexible body and a substantially U-shaped section extending from said flexible body, said substantially U-shaped section being adapted to engage the edge of a window pane capable of being raised and lowered in said vehicle body window frame.

2. Apparatus as claimed in claim 1, wherein said end clip means has a substantially pentagonal configuration and a planar top and bottom surface.

3. Apparatus as claimed in claim 1 wherein said end clip means is metal and said elongated body is a transparent plastic.

4. Apparatus as claimed in claim 1, wherein said end clip means extend from said elongated body with the portion of said clip means which extends from said elongated body being substantially parallel to the body edge from which it extends.

5. A quick attachable and detachable air deflecting apparatus for a vehicle mounted in a conventional vehicle window frame having a moveable window pane capable of being raised and lowered, said air deflecting apparatus comprising an elongated body of transparent planar material having a length substantially equal to the length of the forward edge of said window, an insert edge secured to each end of said elongated body, said insert edges being adapted to be inserted into the frame of said window to mount said deflecting apparatus to said window, a center spring clip secured to the said elongated body, said center spring clip having a portion defining a recess, said recess being adapted to engage said window pane and hold said elongated body to said window pane.

6. An air deflecting apparatus as claimed in claim 5, wherein said insert edges are planar with a substantially pentagonal configuration.

7. An air deflecting apparatus as claimed in claim 5, wherein said insert edges are secured to said elongated body by rivet means.

8. An air deflecting apparatus as claimed in claim 5, wherein said elongated body has a width ranging from 1½ to 3 inch.

9. An air deflecting apparatus as claimed in claim 5, wherein said elongated body is transparent tinted plastic.

10. An air deflecting apparatus as claimed in claim 5, wherein the opposing edges of said elongated body are substantially parallel.

* * * * *